A. McDONALD.
LOCK NUT.
APPLICATION FILED JAN. 18, 1916.

1,196,565.   Patented Aug. 29, 1916.

Witnesses
Hugh H. Ott
Wm. J. Booth

Inventor
Alexander McDonald
By Victor J. Evans
Attorney

UNITED STATES PATENT OFFICE.

ALEXANDER McDONALD, OF HAVRE, MONTANA.

LOCK-NUT.

1,196,565.	Specification of Letters Patent.	Patented Aug. 29, 1916.

Application filed January 18, 1916. Serial No. 72,822.

*To all whom it may concern:*

Be it known that I, ALEXANDER McDONALD, a citizen of the United States, residing at Havre, in the county of Hill and State of Montana, have invented new and useful Improvements in Lock-Nuts, of which the following is a specification.

This present invention relates to improvements in lock nuts, and the object of the invention is to construct a nut which shall be either integrally formed of material ductile under the force of impact of a hammer or to provide the same upon its inner face with a plate or facing of such ductile material whereby the same may be bent to provide a locking lug to be received in the depression in the metal plate or to be received in a denture in a wooden plate and so lock the nut to the plate.

With these and other objects in view, the improvement resides in the construction, combination and arrangement of parts set forth in the following specification and falling within the scope of the appended claim.

Figure 1:
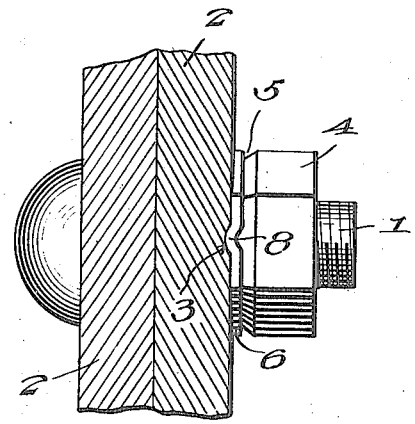
Figure 2:
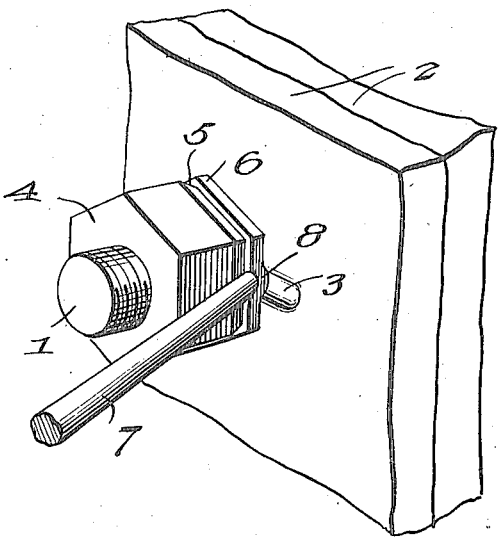
Figure 3:
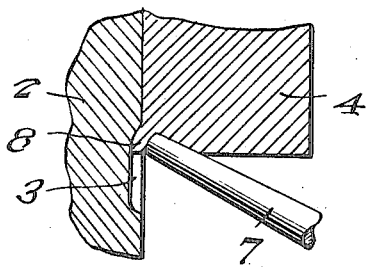
Figure 4:
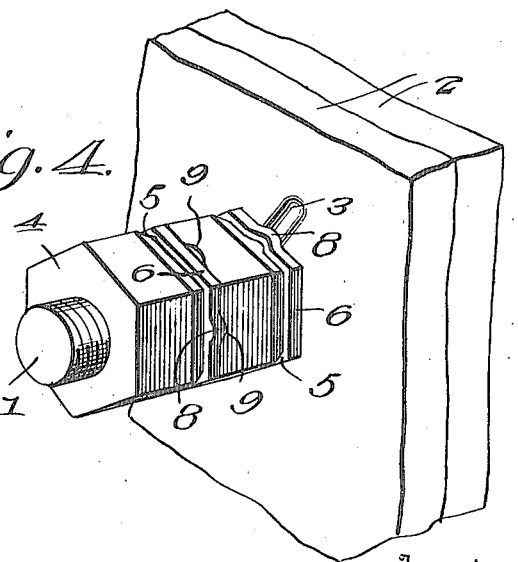

In the drawing: Figure 1 is a transverse sectional view through two plates connected by a bolt on the nut and the said nut being constructed in accordance with the present invention, Fig. 2 is a perspective view illustrating the manner in which a tool engages with the ductile end of the nut and is guided by the angular division wall between the said plate and the nut for indenting the plate to provide the same with a holding lug. Fig. 3 is a sectional view taken in a line with the tool, and Fig. 4 is a perspective view of an inner nut which may be employed when two nuts are employed on a bolt.

In the drawings the numeral 1 designates a bolt which passes through openings in plates 2—2. These plates may be of any part of the machinery frame, angle iron or any other structure that a nut, for the bolt, is to contact with to lock the same together. If the plates are constructed of metal the outer plate adjacent the bolt opening is provided with a suitable depression 3. The numeral 4 designates a nut which is threaded on the bolt and contacts with the outer plate 2.

The nut 4 adjacent its inner face is provided with a continuous groove or depression 5 forming the outer face of the nut with a rib 6, and the inner wall provided by the depression 5 is arranged angularly so that the same will form a guide wall for a tool 7 which has a pointed end and is adapted to receive an impact of force, such as a blow from a hammer to force a portion of the rib outward of the plate and form the same with a lug or projection 8 which enters the depression in the metallic plate or which is embedded in the outer face of a wooden plate, when the nut and bolt connect two wooden plates, as will be readily understood. The rib may provide the end of a plate of ductile material which may be secured to the inner face of the nut in any desired or preferred manner or may be formed therewith in the process of construction, or if desired, the nut may be of such a nature as to readily permit of the bending or indenting of the rib portion thereof to provide a locking lug.

When it is necessary that two nuts be required upon the bolt the outer face of the inner nut is formed with radially disposed depressions 9, one of which receiving the lug provided by indenting the rib of the outer nut, and the rib of the inner nut is indented to provide the lug which locks the nuts to the plate.

From the above description, taken in connection with the accompanying drawing, the simplicity of the device as well as the advantages thereof will, it is thought, be perfectly apparent to those skilled in the art to which such invention appertains without further detailed description.

Having thus described the invention, what I claim is:

The herein described means for locking a nut, comprising a nut formed, adjacent its inner face with a continuous groove providing one of the edges of the nut with a continuous rim of comparatively thin metal, and the outer wall provided by the groove being inclined to the straight face of the rim, whereby to arrange a tool angularly of the nut and with respect to the rim so that the said tool when subjected to an impact of force will indent the rim to provide a lug or projection upon the outer face of said rim and to form a depression in the structure against which the nut is arranged.

In testimony whereof I affix my signature in presence of two witnesses.

ALEXANDER McDONALD.

Witnesses:
EDMUND P. BENNETT,
WALTER L. SCHROEDER.